United States Patent
Dorfner

(10) Patent No.: US 9,921,739 B2
(45) Date of Patent: Mar. 20, 2018

(54) SYSTEM AND METHOD FOR GESTURE CONTROL

(71) Applicant: Microchip Technology Incorporated, Chandler, AZ (US)

(72) Inventor: Andreas Dorfner, Munich (DE)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 0 days.

(21) Appl. No.: 14/596,120

(22) Filed: Jan. 13, 2015

(65) Prior Publication Data

US 2015/0248207 A1    Sep. 3, 2015

Related U.S. Application Data

(60) Provisional application No. 61/947,112, filed on Mar. 3, 2014.

(51) Int. Cl.

| G06F 3/041  | (2006.01) |
| G06F 3/042  | (2006.01) |
| G06F 3/045  | (2006.01) |
| G06F 3/0488 | (2013.01) |
| G06F 3/044  | (2006.01) |
| G06F 3/0481 | (2013.01) |

(Continued)

(52) U.S. Cl.
CPC .......... *G06F 3/0488* (2013.01); *G06F 3/011* (2013.01); *G06F 3/041* (2013.01); *G06F 3/042* (2013.01); *G06F 3/043* (2013.01); *G06F 3/044* (2013.01); *G06F 3/045* (2013.01); *G06F 3/0412* (2013.01); *G06F 3/04815* (2013.01); *G06F 2203/04101* (2013.01); *G06F 2203/04106* (2013.01); *G06F 2203/04108* (2013.01); *G06F 2203/04808* (2013.01)

(58) Field of Classification Search
CPC ...... G06F 3/0488; G06F 3/0412; G06F 3/044; G06F 3/045; G06F 3/04815; G06F 3/042; G06F 3/043; G06F 3/011; G06F 2203/04101; G06F 2203/04106; G06F 2203/04808
See application file for complete search history.

(56) References Cited

U.S. PATENT DOCUMENTS

| 7,162,231    B2 * | 1/2007 | Wu ................... G06F 1/3203 345/102 |
| 2011/0029913 A1   | 2/2011 | Boillot et al. ........... 715/776 |

(Continued)

FOREIGN PATENT DOCUMENTS

EP    2660685 A1    11/2013    ............. G06F 3/041

OTHER PUBLICATIONS

International Search Report and Written Opinion, Application No. PCT/US2015/018226, 12 pages, dated May 19, 2015.

*Primary Examiner* — Md Saiful A Siddiqui
(74) *Attorney, Agent, or Firm* — Slayden Grubert Beard PLLC

(57) ABSTRACT

A system with a processing system, an input device integrated within the processing system and coupled with the processing system, and a sensor arrangement integrated with the processing system and configured to monitor an area above the input device, and a controller coupled with the sensor arrangement to detect predefined input actions, wherein the controller is coupled with the processing system and wherein the predefined input actions are combined with inputs from the input device.

46 Claims, 11 Drawing Sheets

(51) Int. Cl.
 *G06F 3/043* (2006.01)
 *G06F 3/01* (2006.01)

(56) References Cited

U.S. PATENT DOCUMENTS

| | | | |
|---|---|---|---|
| 2011/0179368 A1 | 7/2011 | King et al. | 715/769 |
| 2011/0193818 A1* | 8/2011 | Chen | G06F 3/041 345/174 |
| 2011/0221776 A1 | 9/2011 | Shimotani et al. | 345/647 |
| 2012/0192117 A1* | 7/2012 | Migos | G06F 17/241 715/863 |
| 2013/0100030 A1* | 4/2013 | Los | G06F 3/023 345/169 |
| 2013/0147833 A1* | 6/2013 | Aubauer | G06F 3/0416 345/619 |
| 2013/0176236 A1* | 7/2013 | Ivanov | G06F 3/044 345/173 |
| 2013/0222611 A1* | 8/2013 | Hsu | G06F 1/3231 348/207.1 |
| 2013/0293489 A1* | 11/2013 | Shin | G06F 3/041 345/173 |
| 2014/0298672 A1* | 10/2014 | Straker | H04W 12/06 34/175 |
| 2014/0344922 A1* | 11/2014 | Lam | G06F 21/629 726/19 |
| 2015/0084866 A1* | 3/2015 | Thomas | G06F 3/01 345/158 |

* cited by examiner

SYSTEM AND METHOD FOR GESTURE CONTROL

CROSS-REFERENCE TO RELATED APPLICATIONS

This application claims the benefit of U.S. Provisional Application No. 61/947,112 filed on Mar. 3, 2014, which is incorporated herein in its entirety.

TECHNICAL FIELD

The present disclosure relates to a human device interfaces, in particular to three-dimensional (3D) gesture detection.

Processing devices, such as personal computers, in particular mobile computer, such as laptop computers, tablet computers, etc., usually provide for a variety of input devices, such as a keyboard, touch screen, track pad, mouse, etc. These input devices generally provide for a two-dimensional input device that requires touching and/or manual operation.

SUMMARY

There exists a need for an improved input device that allows for enhancing the functionality of existing input devices.

According to an embodiment, a system comprises a processing system, an input device integrated within the processing system and coupled with the processing system, and a sensor arrangement integrated with the processing system and configured to monitor an area above said input device, and a controller coupled with the sensor arrangement to detect predefined input actions, wherein the controller is coupled with the processing system and wherein the predefined input actions are combined with inputs from said input device.

According to a further embodiment, the sensor arrangement can be an electrode arrangement comprising a plurality of electrodes arranged such that the electrodes surround the input device. According to a further embodiment, the sensor arrangement may comprise infra-red sensors. According to a further embodiment, the sensor arrangement may comprise ultrasound sensors. According to a further embodiment, the input device can be a touch sensor comprising a matrix of capacitive sensor elements, wherein in one operating the matrix of capacitive sensor elements operate as a touch sensor and wherein in a second operating mode predefined sets of sensor elements can be combined to form individual elongated sensor elements, wherein in the second operating mode, the individual elongated sensor elements of the input device form the sensor arrangement to monitor the area above the input device. According to a further embodiment, the electrode arrangement can be configured to detect a gesture performed in a 3D space above the electrode arrangement, wherein the electrode arrangement comprises a transmission electrode for generating a quasi-static electric field and a plurality of reception electrodes arranged around said input device. According to a further embodiment, the electrode arrangement may comprise a plurality of electrode sensors around said input device that can be configured to operate as touch sensors arranged. According to a further embodiment, the electrode sensors around said input device can be configured to operate as non-touching gesture detection sensors in a first operating mode and as touch sensors in a second operating mode. According to a further embodiment, the operating modes may be time-multiplexed. According to a further embodiment, the input actions can be used to block or unblock said input device. According to a further embodiment, the input actions can be used to perform predefined functions of the processing system. According to a further embodiment, the input actions may consist of a sequence of input actions. According to a further embodiment, a sequence may comprise multiple identical input actions. According to a further embodiment, the identical input actions may be moving a hand vertically across the input device twice. According to a further embodiment, a first predefined function is a copy function and a second predefined function is a paste function. According to a further embodiment, an input action combined with an input on said input device may perform a predefined function of the processing system. According to a further embodiment, the input device can be a touchpad and the input action is a touch detection on an electrode of said electrode arrangement and the input from said input device is a touch movement performed on said touch pad. According to a further embodiment, the electrode arrangement may comprise a plurality of electrodes and the touched electrode defines the predefined function which is selected from the group consisting of horizontal scrolling, vertical scrolling, and zooming.

According to another embodiment, a system may comprise a processing system, an input device integrated within the processing system and coupled with the processing system, and a sensor arrangement integrated with the processing system and configured to monitor an area around said input device, and a controller coupled with the sensor arrangement to detect predefined non-touching input actions, wherein the controller is coupled with the processing system, wherein for a detection of a non-touching input action, a predefined sequence of gestures is required to distinguish a non-touching input action from an unintentional movement in the area around said input device.

According to a further embodiment of the above system, the sensor arrangement is an electrode arrangement comprising a plurality of electrodes arranged such that the electrodes surround the input device, and the electrode arrangement is configured to detect a gesture performed in a 3D space above the electrode arrangement, wherein the electrode arrangement comprises a transmission electrode for generating a quasi-static electric field and a plurality of reception electrodes arranged around said input device. According to a further embodiment of the above system, the sensor arrangement may comprise infra-red sensors or ultrasound sensors. According to a further embodiment of the above system, the input actions can be used to perform predefined functions of the processing system. According to a further embodiment of the above system, the sequence of gestures may comprise multiple identical input actions. According to a further embodiment of the above system, the identical input actions may be moving a hand vertically across the input device twice. According to a further embodiment of the above system, the input device can be a touch sensor comprising a matrix of capacitive sensor elements, wherein in one operating the matrix of capacitive sensor elements operate as a touch sensor and wherein in a second operating mode predefined sets of sensor elements can be combined to form individual elongated sensor elements, wherein in the second operating mode, the input device forms the sensor arrangement to monitor the area above the input device.

According to another embodiment, a method for operating a data processing device, wherein the data processing device comprises an input device integrated within the processing system, may comprise the steps: integrating a sensor arrangement within the data processing device such that an area surrounding said input device is monitored by the sensor arrangement, and detecting predefined input actions by a controller coupled with the electrode arrangement, and combining the predefined input actions with inputs generated by said input device.

According to a further embodiment of the above method, the sensor arrangement can be an electrode arrangement comprising a plurality of electrodes arranged such that the electrodes surround the input device. According to a further embodiment of the above method, the sensor arrangement may comprise infra-red sensors. According to a further embodiment of the above method, the sensor arrangement may comprise ultrasound sensors. According to a further embodiment of the above method, the electrode arrangement may be configured to detect a non-touching gesture performed in a 3D space above the electrode arrangement, wherein the electrode arrangement comprises a transmission electrode for generating a quasi-static electric field and a plurality of reception electrodes arranged around said input device. According to a further embodiment of the above method, the electrode arrangement may comprise a plurality of electrode sensors around said input device, and the method may comprise configuring the electrode sensors to operate as touch sensors. According to a further embodiment of the above method, the method may comprise configuring the electrode sensors around said input device to operate as non-touching gesture detection sensors in a first operating mode and as touch sensors in a second operating mode. According to a further embodiment of the above method, the operating modes may be time-multiplexed. According to a further embodiment of the above method, the input actions may be used to block or unblock said input device. According to a further embodiment of the above method, the input actions may be used to perform predefined functions of the processing system. According to a further embodiment of the above method, the input actions may consist of a sequence of input actions. According to a further embodiment of the above method, a sequence may comprise multiple identical input actions. According to a further embodiment of the above method, the identical input actions can be moving a hand vertically across the input device twice. According to a further embodiment of the above method, the input actions may consist of a sequence of input actions. According to a further embodiment of the above method, a sequence may comprise a plurality of identical input actions. According to a further embodiment of the above method, a first predefined function can be a copy function and a second predefined function is a paste function. According to a further embodiment of the above method, an input action combined with an input on said input device may perform a predefined function of the processing system. According to a further embodiment of the above method, the input device may be a touchpad and the input action may be a touch detection on an electrode of said electrode arrangement and the input from said input device is a touch movement performed on said touch pad. According to a further embodiment of the above method, the electrode arrangement may comprise a plurality of electrodes and the touched electrode defines the predefined function which is selected from the group consisting of horizontal scrolling, vertical scrolling, and zooming.

DETAILED DESCRIPTION

Figure 1:
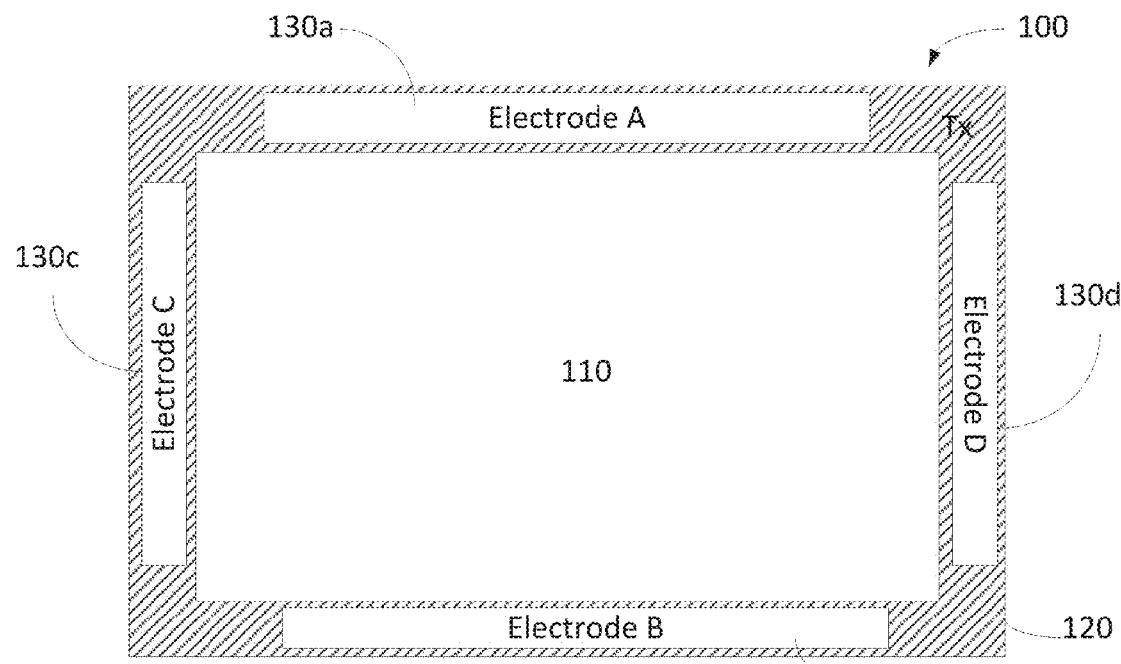
FIG. 1 shows an embodiment of a sensor arrangement.

According to various exemplary embodiments, an additional sensor input device can be combined with existing conventional input devices and an improved operating method can be provided to enhance the functionality of these input devices. For example, a 3D detection system or an additional touch detection system or any other type of input sensor could be integrated within an input device of a processing system. According to an embodiment, a good integration spot for a 3D gesture detection sensor, for example, an electric field or "e-field" sensor, or an additional touch or sensor detection system in a notebook or laptop computer could be beneficial, particularly where intuitive gestures might improve the current user interface.

For example, according to one embodiment, in the case of 3D detection systems of the e-field type, having an electrode design without using a transmitter electrode covering the whole sensing area allows for an easy integration of the additional sensor. The electrode design shown in FIG. 1, for example, provides a layout that locates electrodes around a perimeter of an input device, according to some embodiments, for example, a touchpad, and therefore an already existing notebook/laptop structure design needs no significant change or alteration to accommodate these electrodes. This sort of design brings the sensor into the space where the user has his hand for touchpad control. Also, it is possible to avoid having to multiplex electrode input signals with the touchpad input signals. According to various embodiments, the gesture integration can be performed, for example, to substitute user interactions that may not be convenient at a given moment (e.g., key shortcuts).

Thus, a multi sensor arrangement (e.g., touch and/or 3D sensing) surrounding an existing input device is proposed according to various embodiments. The electrode arrangement can be designed to typically enclose/surround mechanical input devices like keypads, non-touch displays, touch displays, single touch touchpads and multi touch touchpads. The electrode sensor arrangement can be designed to enable extended user interface solutions with single-touch, multi-touch and/or 3D hand movement over time.

The additional input device surrounding an existing input device may provide for a three-dimensional gesture detection according to various embodiments. Such a more advanced sensor arrangement is for example a three-dimensional gesture detection system that does not require any touch. According to some embodiments, a three-dimensional electric field sensor controller introduced by Applicant produces through a dedicated sensor arrangement a quasi-static electric field, for example, using a 100 kHz signal fed to a transmitting electrode. Such an electric field might extend vertically more than 10 cm from the sensor arrangement generating the field. A user can enter this field without touching the device, for example with a hand, and gestures performed by the user will disturb the electric field. Such distortions can then be measured, for example, using receiving electrodes, and dynamic and static characteristics determined by the arrangement can be used to conclude which type of gesture/input command has been performed. The device can further be controlled to also operate as a touch sensor. In particular when time multiplexing is used, such a sensor system can perform both, non-touching gesture detection and touch detection.

FIG. 1 shows an electrode arrangement 100 that can be used for both, a 3D gesture detection system as described above and/or an additional touch detection system. Such an additional input system can be combined with another integrated input device of the processing system. The electrode arrangement is designed to include an "open" area 110 in which another input device (e.g., touch pad, track ball, keyboard, touchscreen, joystick, etc.) of the processing system might be arranged. To allow such an arrangement, a transmitter electrode 120 might be implemented in the form of a rectangular frame. According to various alternative embodiments, such a "frame" does not necessarily have to be rectangular, but could be elliptical, circular, or have any other frame-like shape. Various receiver electrodes 130a, b, c, d can be arranged in a plane above a transmitter plane in which the transmitter electrode is arranged according to an embodiment as shown in FIG. 1. However, if more space is available, these electrodes can also be arranged in the same plane, for example, as the surrounding frame 120. According to some embodiments, the stacked layer arrangement as shown in FIG. 1 might be particularly beneficial in certain applications as it requires less real estate, which may be important, for example, if the device is added or retrofitted to an existing input device arranged in area 110.

According to other exemplary embodiments, a multi-sensor arrangement for touch detection could be used instead of the 3D detection electrode arrangement shown in FIG. 1. For example, such a multi-sensor arrangement could look similar to the arrangement shown in FIG. 1, but without the transmission electrode 120. However, according to other embodiments, the transmission electrode 120 could be used as part of a capacitive touch detection arrangement, for example, forming an opposing electrode for touch electrodes 130a, b, c, d. Other touch detection electrode arrangements are of course possible. Moreover, optical or acoustic sensor arrangements are possible according to other embodiments.

Figure 2:
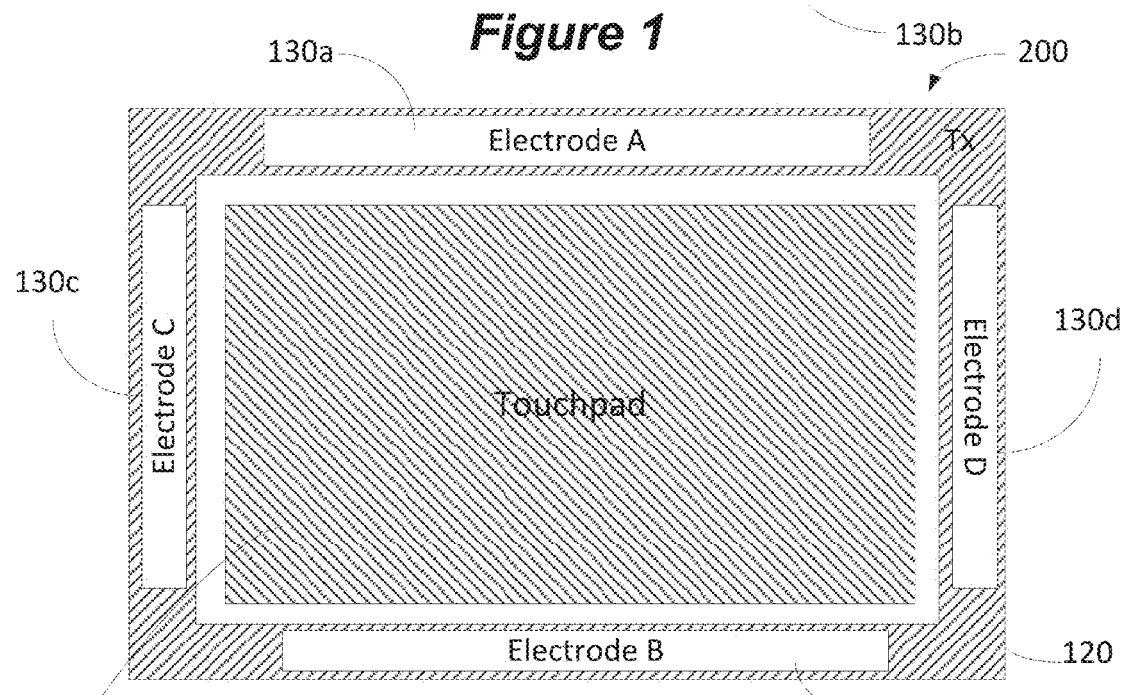
FIG. 2 shows the embodiment of FIG. 1 combined with a trackpad.
Figure 3:
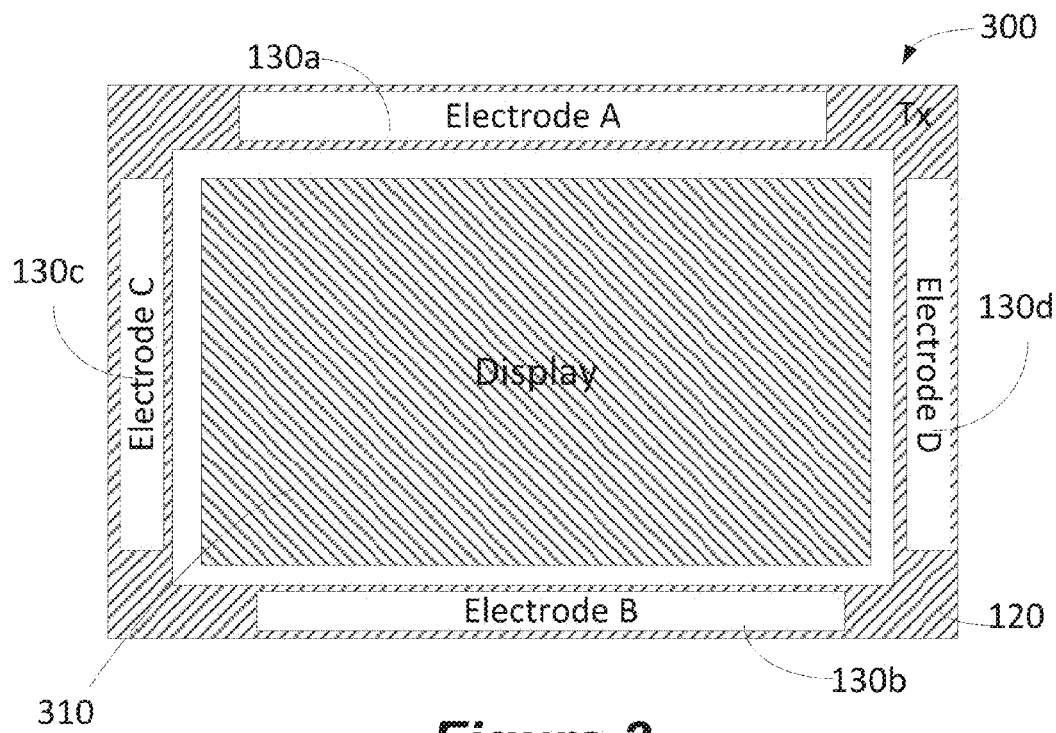
FIG. 3 shows the embodiment of FIG. 1 combined with a display.
Figure 4:
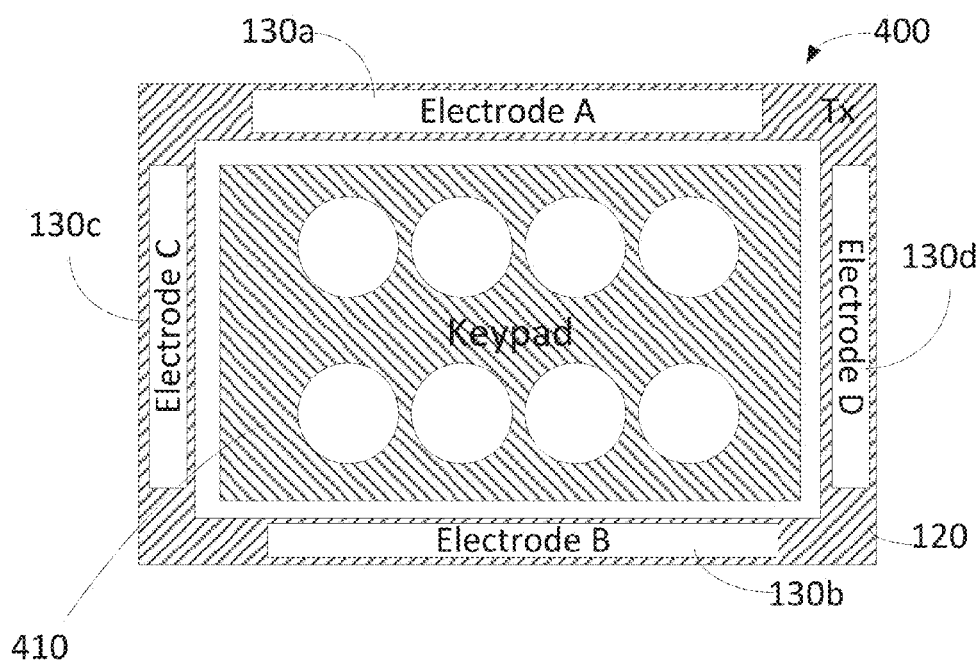
FIG. 4 shows the embodiment of FIG. 1 combined with a keyboard.

FIGS. 2-4 show various possible arrangements with such a rectangular sensor arrangement. In FIG. 2, the sensor arrangement is designed to surround a conventional touch pad 210 as known in particular from laptop computers and therefore provides for area 110 can accommodate the touchpad 210. The touchpad 210 may include one or more hardware buttons for select functions (not shown in FIG. 2), for example, which may be similar to left and right buttons on a computer mouse.

FIG. 3 shows another embodiment, wherein a touch sensitive display 310 is arranged in the center area 110. Such displays are in common use in tablet computers, PDA's, smart phones, etc.

FIG. 4 shows an example with a keyboard 410 arranged in the center area. While FIG. 4 shows a specific number of keys, the number of keys and key arrangement may vary depending on the application. Additionally, other input devices may be used according to various embodiments.

The transmitter electrode 120 in a 3D sensor arrangement can also be split into more than one electrode. Moreover, the number of receiving electrodes 130a, b, c, d that provide for individual signals is not limited to four. For example, other applications might utilize a greater number of receiving electrodes, and still other applications might utilize fewer receiving electrodes. The transmitter electrode 120 is used to generate a quasi-static alternating electric near field and the receiving electrodes 130a, b, c, d are used to detect disturbances in such a field. The electrode arrangement, when arranged in layers as shown in FIGS. 1-5, may comprise a non-conductive substrate on top of which the receiving electrodes 130a, b, c, d are arranged. The transmitting electrode 120 may be arranged on a bottom side of such a substrate. For example, a double sided printed circuit board may be used. However, other substrates may be used independent from multi-layer or single layer arrangement. The electrodes do not need to be formed in a top or bottom layer but could also be formed in one of the intermediate layers of a multi-layer substrate. All electrodes can be formed by a conductive layer such as a copper layer, which is typical for a printed circuit board. Thus, reception electrodes can be formed by etched structures in such a copper layer whereas the entire bottom copper layer or an inner layer may form the transmission electrode 120 as shown in FIG. 1. However, if implemented on a printed circuit board, certain areas on the top and/or bottom side may be used to place a respective controller component, such as an integrated circuit device, and/or other necessary components which can be directly connected with the electrodes via etched circuit paths, vias, etc.

Figure 5:
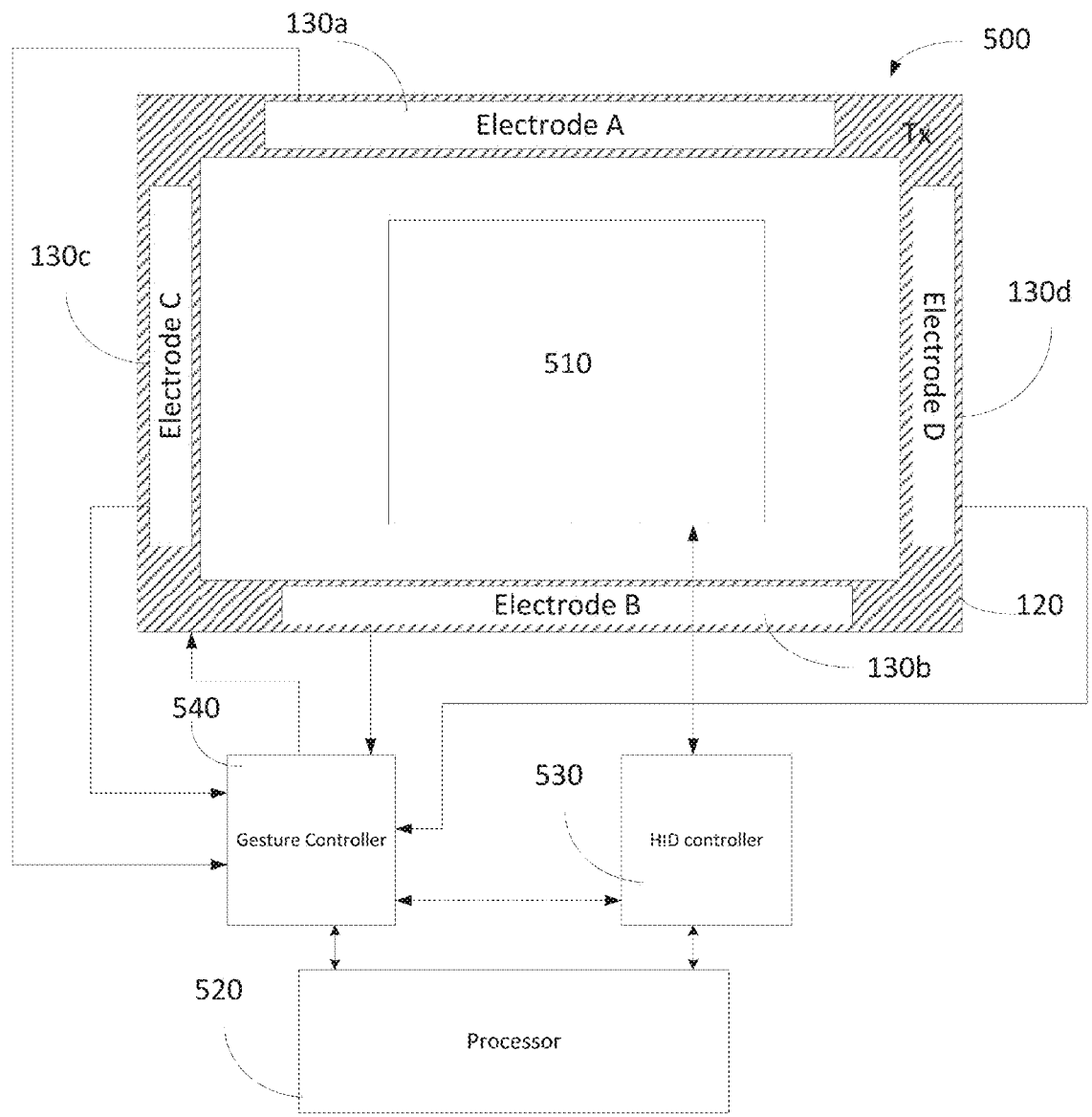
FIG. 5 shows a block diagram of circuitry combined with the embodiment of FIGS. 1-4.

An example of an integrated circuit device that can be connected to such an electrode structure 100-400 to be used in a 3D detection system is a gesture evaluation controller MGC3130 also called GestIC® manufactured by Applicant, a data sheet for which is available from Applicant and hereby incorporated by reference. Achievable range is an important factor in electric near field sensing and in GestIC® three-dimensional gesture recognition, and in tracking technology in particular. FIG. 5 shows a block diagram of such a combined system. Again, the 3D sensor structure 500 is similar to those shown in FIGS. 1-4. The surrounded input device is generally depicted as input unit 510. A processor, e.g., a microcontroller 520, is provided which is coupled with a human interface device (HID) interface controller 530 and a gesture controller 540, for example, the above mentioned MGC3130. HID interface controller is connected with input device 510 and gesture controller 540 is coupled with the transmission and reception electrodes 120, 130a, b, c, d. alternatively, according to some embodiments, as indicated by the dotted connection between HID controller 530 and Gesture controller 540, Gesture controller 520 may not be directly connected with the processor but only with HID controller 530. Processor 520 controls Gesture controller 540 in such an embodiment through HID controller 530.

As shown in FIGS. 1-5, electrode sensors 130a, b, c, d are used to detect the approach of a user hand. The sensor information can be used for gesture recognition, 3D hand positioning and for various touch and tapping combinations. The electrode arrangement according to this embodiment is in a rectangular arrangement to fit around the touchpad (FIG. 1). However, other shapes are possible as discussed above.

The electrode arrangement form can therefore be different for other input devices (e.g., circular for round input devices). The touchpad 210 in the middle of the sensor can work at the same time. Also combinations of the touchpad input information and the extended sensor arrangement can be used to trigger events. Using gesture combinations like a twice performed hand movement from the keyboard towards the lower edge of the touchpad (in case the touch pad is arranged below the keyboard, as typical for many laptop computers), will make the gesture input more reliable compared to a single performed gesture since typical hand movements not intended to trigger events may look the same to the sensor as those that are intended to trigger events.

In a 3D sensor arrangement as shown in FIGS. 1-5, the input sensor electrodes 130a, b, c, d may be used to determine the position of the user's hand over time. The input device 510 can be:

optical (e. g. camera (time of flight, stereoscopic), IR sensors and transmitter,
acoustical (ultrasound),
capacitive/e-field measurement (e.g., mutual, self-measurement of electrodes arranged in a matrix), or
any other suitable input device such as mechanical input devices (e.g., keyboards, trackball, etc.).

A 3D sensor arrangement 100, 200, 300, 400, 500 as shown in FIGS. 1-5, may be used to determine the position of the user's hand over time. According to various other embodiments, the sensor arrangement may have different types of sensors and can be:

optical (e. g. camera (time of flight, stereoscopic), IR sensors and transmitter,
acoustical (ultrasound).

Figure 6:
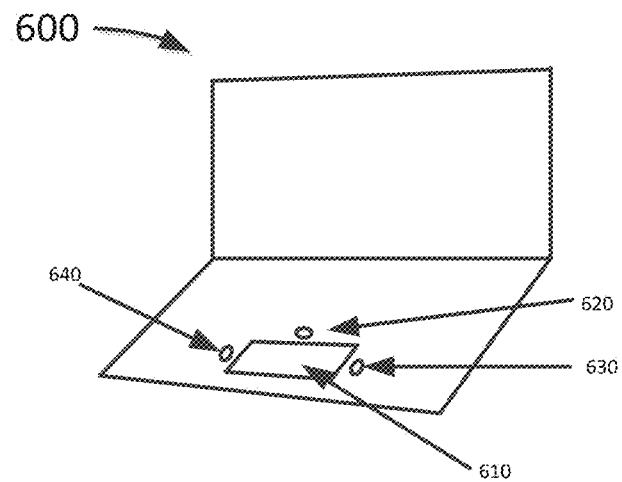
FIGS. 6 and 7 show embodiments with different types of gesture detection systems.
Figure 6:
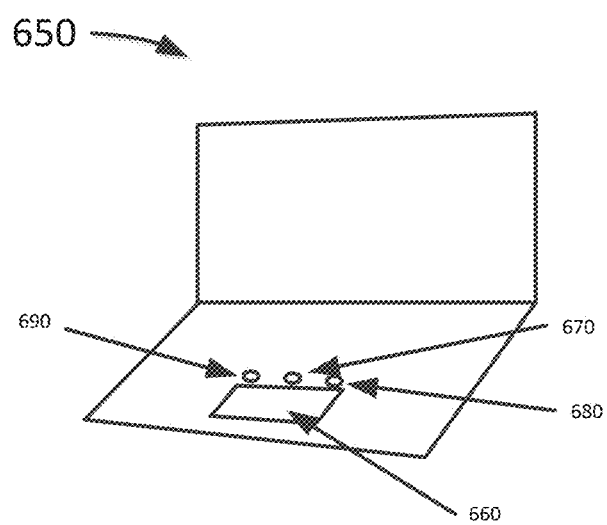

In these embodiments, the sensors may be arranged in a similar fashion as shown with the electrodes in FIGS. 1-5. However, in some technologies, such as sensors using a camera, the actual sensor may not be arranged around the input device but placed in a position that allows the sensor to monitor the area or space above the input device. For example, FIG. 6 shows on top a first example of a laptop device 600 integrated trackpad 610 and three infrared sensors 620, 630, and 640 arranged around the trackpad 630. The bottom of FIG. 6 shows another example of a laptop device 650 with integrated trackpad 660 and three infrared sensors 670, 680, and 690 arranged above and along the top edge of the trackpad 660. Other arrangement for infrared sensors may apply.

Figure 7:
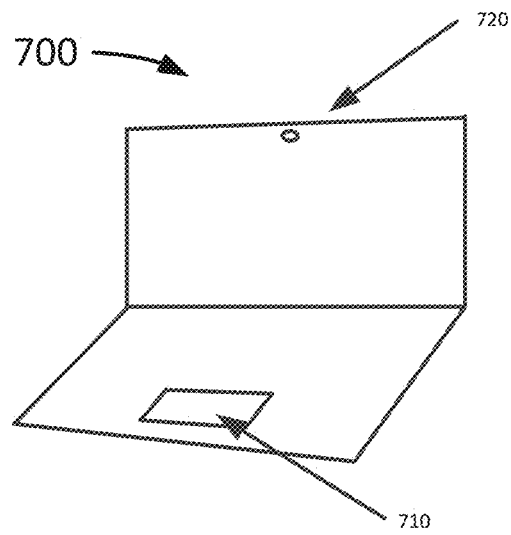
Figure 7:
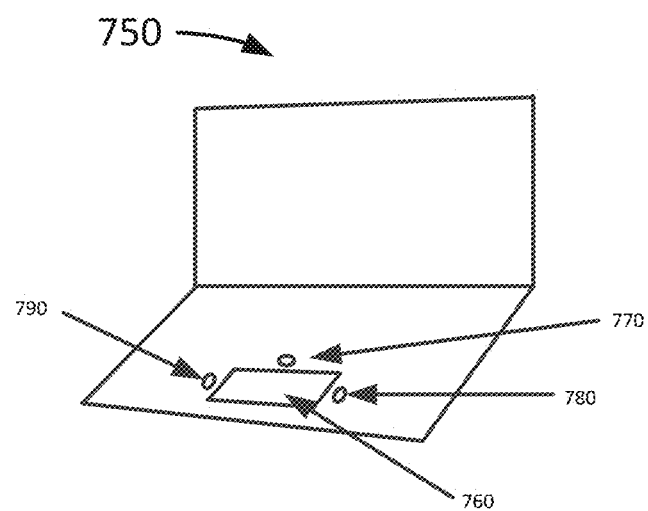

FIG. 7 shows two examples of laptop devices 700 and 750 with integrated trackpad 710 and 760, respectively. The first embodiment 700 uses a camera 720 to detect the area above the trackpad 710. The second embodiment 750 uses three ultrasound sensors 770, 780, and 790 arranged around the trackpad 760 in similar fashion as in the embodiment 600. Again, other location for the sensors may apply to monitor the area above the trackpad 710, 760 or any other suitable input device.

As shown in FIGS. 1-5, a specific embodiment of a capacitive/e-field input device may comprise a set of 4 individual receiving electrodes, including 2 vertically aligned electrodes (sensor electrodes 130a, b) and 2 horizontally aligned electrodes (sensor electrodes 130c, d). When using a gesture controller 540, for example the GestIC controller manufactured by the assignee of the present disclosure, four receiving electrodes 130 may be used in combination with one transmitting electrode structure 120 (stacked or in one layer). As mentioned above, in a capacitive self-measurement system, the four RX and the one TX electrodes 120, 130a, b, c, d may be used as separate touch detection electrodes.

With the sensor electrodes 130a, b, c, d, measurements may be used to extract from the raw signal (i.e., of the above sensors), amplitudes, distances from sensors, position and derivatives (e.g., first, second and higher order) over time, etc., as generated by movements of the user's hand.

Usage of such derived features as input of a classifier (e.g., hidden Markov model, dynamic time wrapping, neural networks, vector machines, etc.), and deterministic classifiers (e.g., general state machine) to classify the hand movements to a predefined (trained) set of gestures.

As shown in FIGS. 1-5, a specific embodiment of a capacitive/e-field input device may comprise a set of 4 individual receiving electrodes, including 2 vertically aligned electrodes (sensor electrodes 130a, b) and 2 horizontally aligned electrodes (sensor electrodes 130c, d). When using a GestIC gesture controller 540, four receiving electrodes 130 may be used in combination with one transmitting electrode structure 120 (stacked or in one layer). As mentioned above, in a capacitive self-measurement system, the four RX and the one TX electrodes 120, 130a, b, c, d may be used as separate touch detection electrodes.

The sensor system 120, 130a, b, c, d detects the touch/proximity of the hand/palm of the user on all outer sides of the touchpad 210 or other input device 310, 410, 510. The multi-sensor information can be used to block the touchpad 210 or other input device 310, 410, 510, for example, during keyboard typing, to avoid cursor jumps.

The proximity of the multi-electrode sensor arrangement 120, 130a, b, c, d can be used to wake up the processing device, such as a notebook/laptop computer, once the user approaches/is approaching the touchpad. Defined gestures might also be used for device wake-up. For example, this could be done in a low power mode, which might be needed for wakeup functionality. Using this kind of wake-up, with the approach of the user's hand, the user may not notice at all, that the device was in an low power mode with reduced functionality, since the input device 210 can switch back to full working mode before the user is touching it.

The multi-sensor arrangement 120, 130a, b, c, d can be used, according to one operating mode, to open/activate menus (e.g., a menu for function key controls, such as F1-F12, etc.) by touching, tapping or performing a defined hand movement.

According to other operating mode, the multi-sensor arrangement 120, 130a, b, c, d can also be used to substitute shortcut key combinations or even single key functions by touch combinations or gestures performed above the touchpad. For example, a user could twice perform a hand movement, from above the touchpad and moving toward the keyboard, to perform a task such as copying content, and likewise twice perform another hand movement from above the keyboard and moving toward the touchpad (i.e., away from the keyboard) to perform another task, such as pasting the copied content.

Additionally, specialty keys, e.g., "CTRL," ALT, "DEL," etc., are sometime placed at different positions, which often varies among different laptop models. In such cases, the user may have to search for the desired specialty key. However, with the intuitive gesture/touch substitution of shortcuts as described above, the user may not have to search for such keys anymore.

Other examples according to various embodiments or operating modes are also possible. For example, a left/right/left hand movement might be used for a delete function, or double hand movement from the keyboard towards touchpad might be used to close an application. Generally, it is possible to link any device function to some combination of user input gesture/touch/button/key press/etc. Such sensor arrangement and decoding method may simplify the usage of existing user input devices and generate a new way of controlling devices.

For example, a combination of input device and surrounding sensor device can be used to provide additional functionality. For example, a touch on a single finger/multi finger touchpad and a touch on an electrode of the surrounding sensor arrangement can be used to trigger, for example a scroll functionality. In this example, moving the finger on the touchpad while the second finger is on one of the surrounding electrodes can be used for horizontal and/or vertical scrolling. According to another functionality, a touch on a single finger/multi finger touchpad and a touch on one of the electrodes of the surrounding electrode arrangement can be used to trigger a zoom functionality. Here, moving the finger on touchpad while touching with a second finger one of the outer electrodes of the surrounding electrode arrangement causes a zooming function. Of course other combinations and associated functions can be implemented according to various other embodiments.

Figure 8:
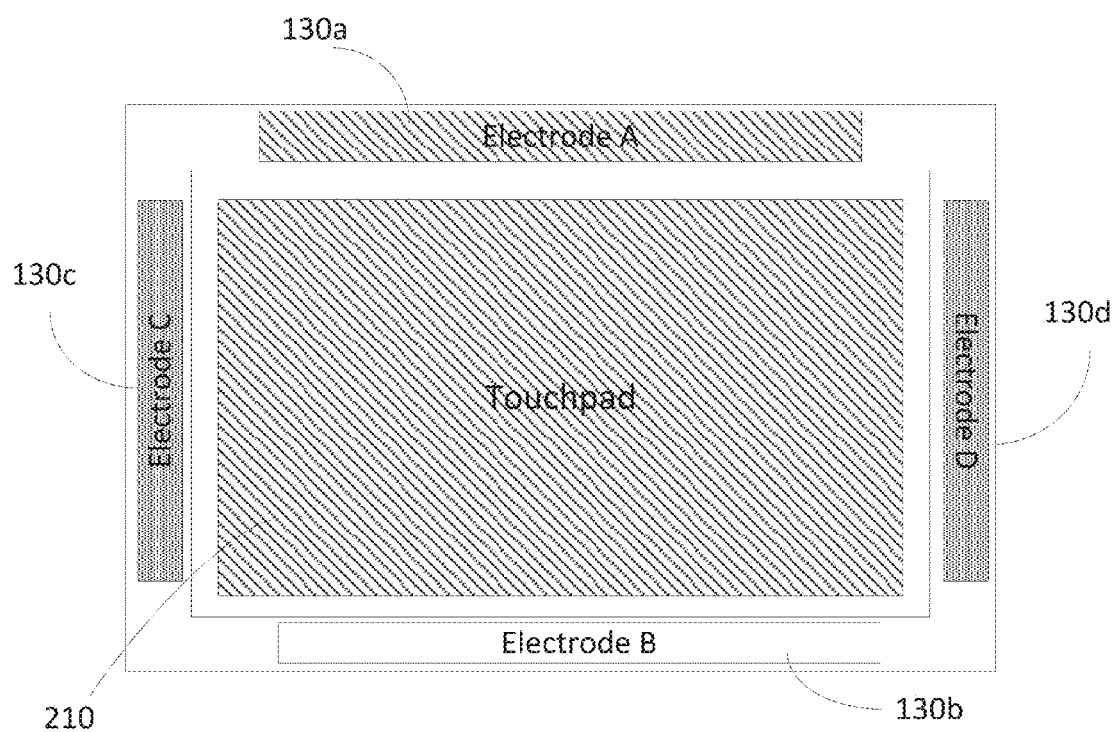
FIGS. 8-12 show possible implementations of various combinations of touch and gestures of a input device and an additional sensor arrangement according to FIG. 1.

FIG. 8, for example, shows a possible implementation of a lock input device function, that may be useful, for example during keyboard usage. Here the touch proximity information obtained from the surrounding electrodes 130a-d may be used to provide this functionality. If a touch/approach at one or more sensors 130a, b, c, d is detected, the input device 510, for example, a touch pad 210, may be locked, for example, to avoid cursor jumps whenever electrode 130a and either electrode 130c or electrode 130d are touched at the same time. This kind of touch/approach pattern is likely when the user is using a 10 finger typing method and the touchpad with surrounding electrodes is below the keyboard. The palm of the left hand creates a touch/approach at the electrodes 130a and 130c and or the right hand creates a touch/approach on electrode 130a and 130d. Of course, other combinations of sensor electrodes may be used.

A sequence of gestures may be considered as input action. A sequence of gestures helps to distinguish between a hand movement to interact with the device 210, 310 and 410 and an intended gesture as input information. A sequence of gestures can be a repetition of a single gesture or a sequence of different gestures. The time between gestures and thus the time for the sequence may get adjusted accordingly to create a unique interaction. For example, the time between the gestures can be set to a predefined minimum limit and/or to a predefined maximum limit. Also the time for the gesture itself can be adjusted if the gesture itself has a duration.

Figure 9A:
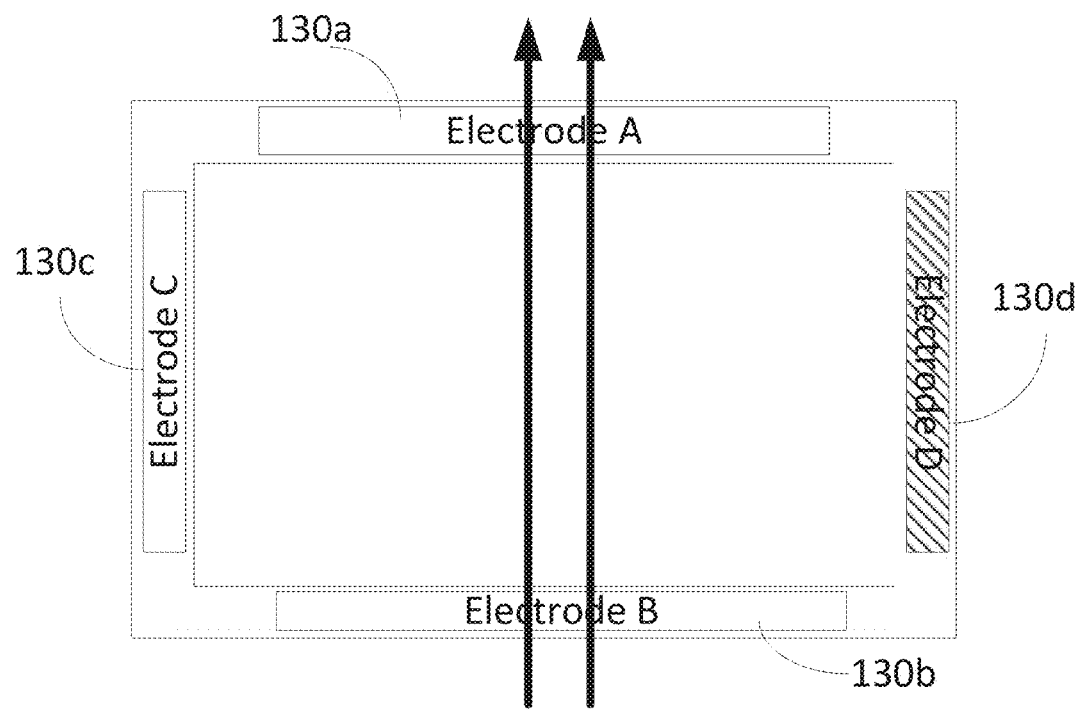
Figure 9B:
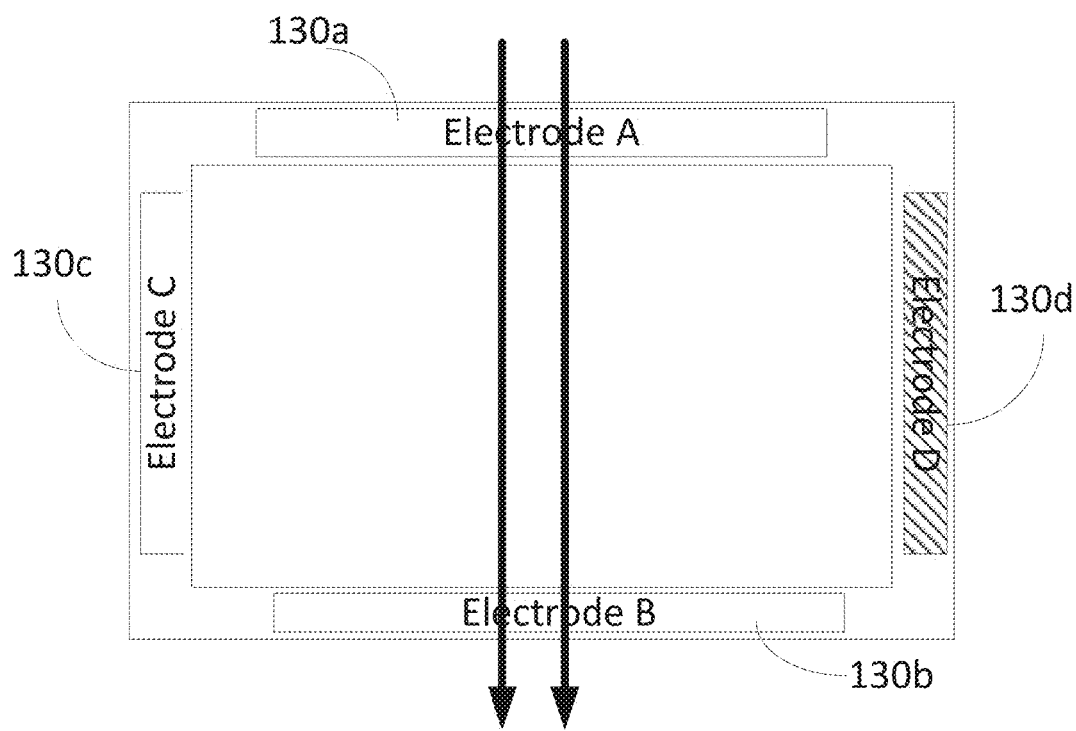

FIGS. 9A and 9B show a possible implementation of gesture sequence interpretation to perform a copy & paste function. Here, as shown in FIG. 9A, a double performed non-touching hand movement starting over sensor 130b to sensor 130a would be interpreted as a copy or Ctrl+'c' function. Likewise, as shown in FIG. 9B, a double performed non-touching hand movement from sensor 130a to sensor 130b would initiate a paste or Ctrl+'v' function.

Figure 10A:
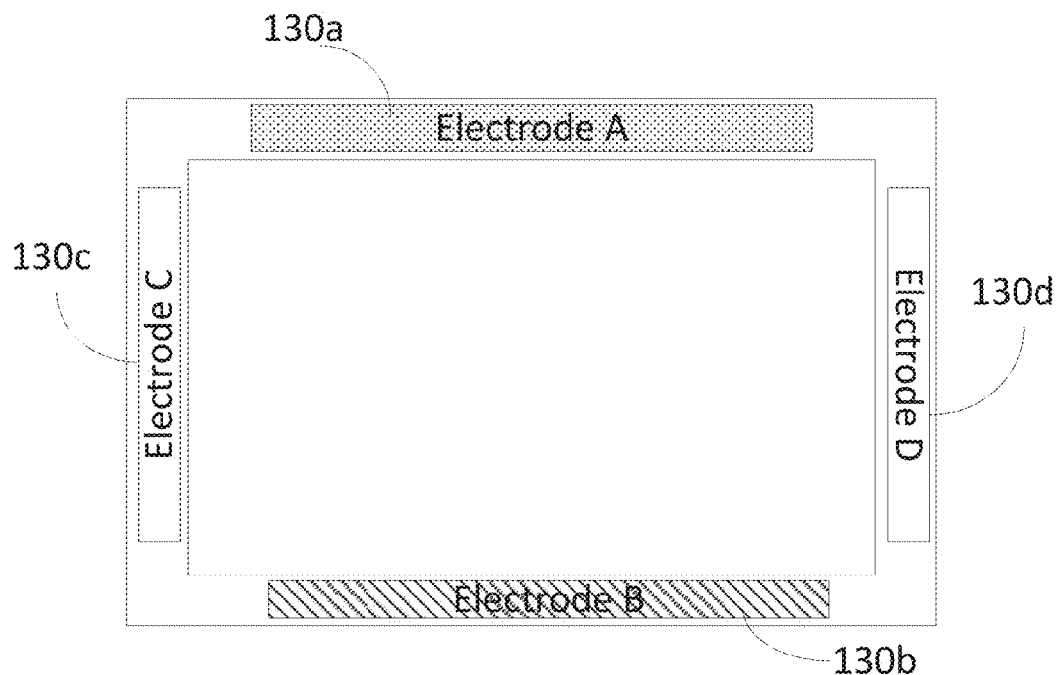
Figure 10B:
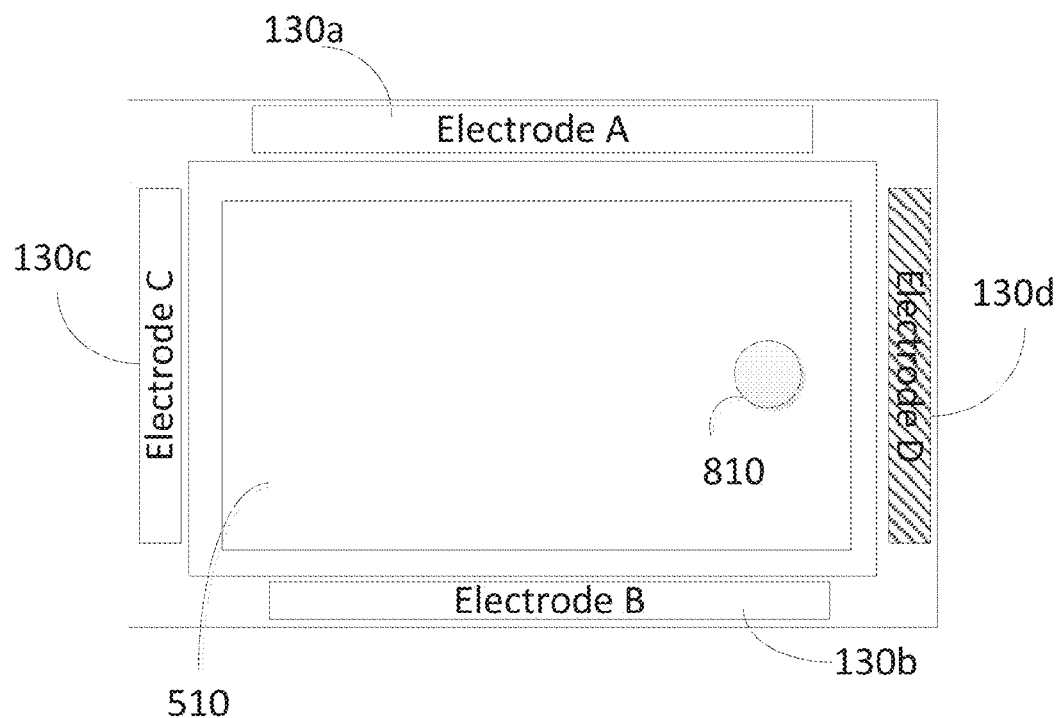

FIGS. 10A and 9B shows possible gesture combinations for initiating opening of context menus, such as, volume and brightness control menus. As shown in FIG. 10A, a touch on sensor 130b and a double tap on sensor 130a may initiate such a function. Alternatively or in addition, as shown in FIG. 10B, a touch, indicated by the circle 810, on the touchpad or action on the input device 510 combined with a touch, tap, or double tap on one of the sensor electrodes 130d could initiate such a functionality. Again, other combinations may be used. Moreover, a certain proximity of the touch 810 and the combined electrode touch may be required according to some embodiments.

Figure 11A:
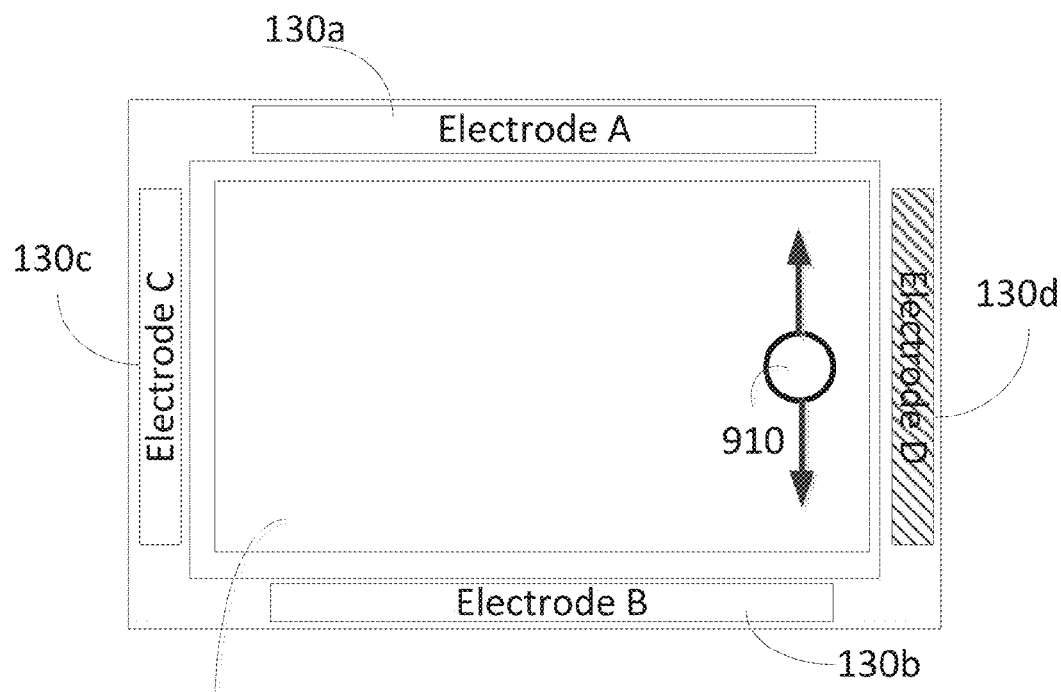
Figure 11B:
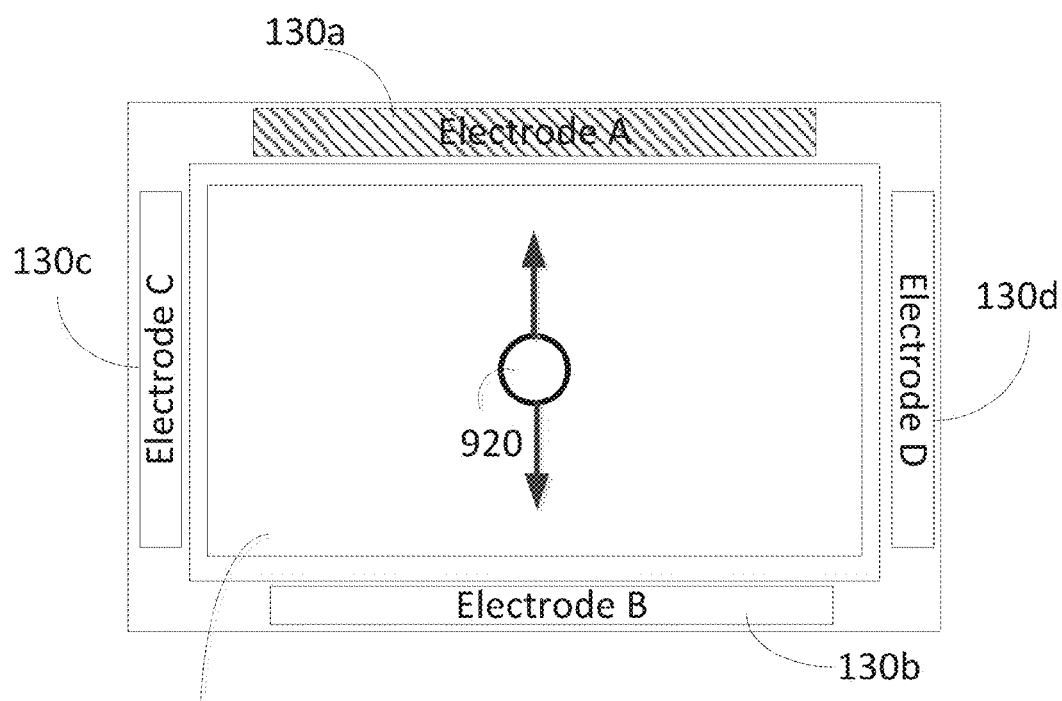

FIGS. 11A and 11B shows the above mentioned scroll function in more detail. Here, a combination of a touch of one of the electrodes 130a-d, for example, electrode 130d, and movement 910 of another or multiple finger(s) on the touch pad 210 could be used for a scrolling function as shown in FIG. 11A or if the movement 920 is combined with another electrode, for example, electrode 130a, as shown in FIG. 11B a zooming function will be performed. Again other combinations may be used according to various embodiments.

Figure 12:

FIG. 12 shows yet another possible implementation to perform a wake-up from standby/sleep/screensaver mode. For example, the proximity data obtained from one or more electrodes 130a-d can be used to wake up the device if a specific movement/gesture is performed. According to another function, a backlight of the keyboard may be activated if a specific touch gesture or non-touching gesture is performed using the electrodes 130a-d.

According to yet further embodiments, an existing hardware can be used and controlled in such a way that it allows a so-called virtual formation of electrodes A, B, C, D similar as those shown in FIGS. 1-5. Thus, in these embodiments, the electrodes A, B, C, D are not formed as separate hardware around an existing input device.

Figure 13:
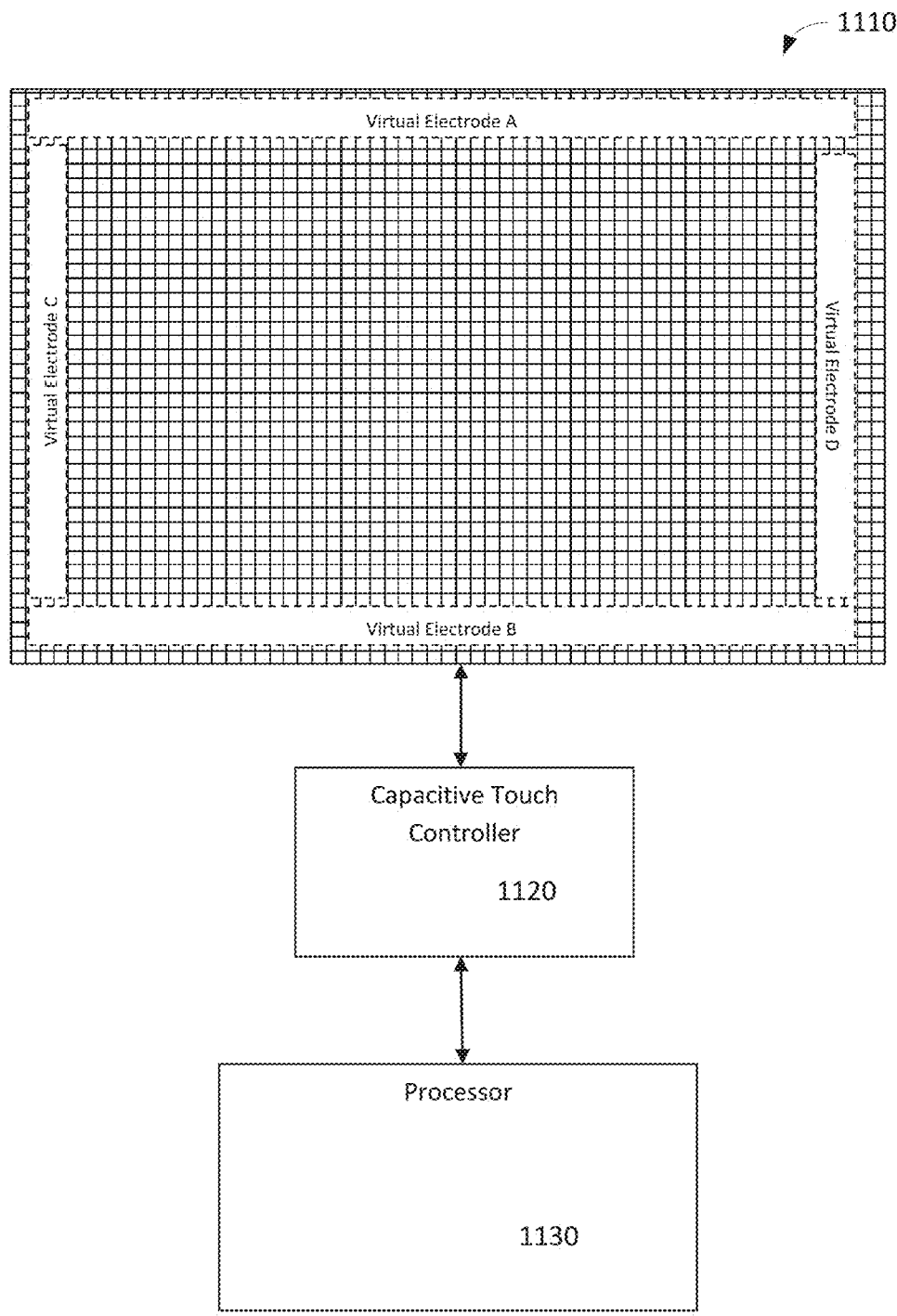
FIG. 13 shows another embodiment of a virtual sensor arrangement formed in an existing capacitive touch sensor area.

For example, in the embodiment shown in FIG. 13, a touchpad 1110 provides for a matrix of electrodes that allow, for example, self and mutual capacitance measurements using a capacitive touch controller 1120. Similar as in the embodiment shown in FIG. 5, the capacitive touch controller is coupled with processor 1130. Touch controller 1120 and processor 1130 may be integrated in a microcontroller or may be part of a system on chip or any other suitable sub-system of a processing device, such as, e.g. a laptop or tablet computer. The touchpad 1110 can be controlled in such a way that, for example, only the capacitive electrodes adjacent to the outer edges are used in measurements. In other words, the electrodes forming the touch sensitive surface can be separately controlled in such a way, that individual areas of the sensor can be activated, for example, switched together to form a specific area. This may be performed in a time multiplex mode for each simulated electrode A, B, C, D according to some embodiments. For a capacitive touchpad having a matrix structure as shown in FIG. 13, self- or mutual capacitance measurement may be used to simulate electrodes A, B, C, D. For example, a top row can be selected as a virtual electrode A. Similarly, a bottom row can be used for electrode B, an outer most left column for electrode C and an outer most right column for electrode D. Other selection can be made depending on the measurement principle to form the virtual electrodes A, B, C, D and they may not necessarily have the shape as shown in FIG. 8.

The virtual electrodes A, B, C, D may allow for the same principles as discussed above. Thus, depending on the sensitivity of the capacitive measurements of the touch controller 620, they may be used for 3D measurements using an electric field generated, for example, by a common electrode arranged under the matrix. Alternatively, they can be used as touch sensors. The designated function of the input device may be multiplexed with this additional senor function provided by the virtual electrodes A, B, C, D. Thus, the same functionality as discussed above can be provided by such a device.

Other input devices may also be capable to simulate the surrounding sensor device as shown in FIGS. 1-5. Thus, further embodiments using the principles as discussed with respect to FIG. 13 are not limited to a touchpad but could be extended to other suitable input devices, for example but not limited to optical and acoustical sensor devices, that allow for a two- or three dimensional sensor detection.

What is claimed is:

1. A system comprising:
a processing system;
an input device integrated within the processing system and coupled with the processing system; and
a sensor arrangement integrated with the processing system and configured to monitor an area above said input device for detection of non-touching gestures, and a controller coupled with the sensor arrangement to detect said non-touching gestures, wherein the controller is coupled with the processing system and wherein the controller is further configured to detect predefined non-touching input actions and forward associated commands to the processing system;
wherein:
the predefined non-touching input actions include a sequence of multiple, identical non-touching gestures performed in succession; and
the controller is configured to detect the sequence of multiple, identical non-touching input gestures performed in succession and to forward an associated command to the processing system;
wherein the sensor arrangement is configured to detect a double movement of a hand from a keyboard towards the input device and, based upon the detection, the controller is configured to identify the movement as a gesture to close an application.

2. The system according to claim 1, wherein the sensor arrangement is an electrode arrangement comprising a plurality of electrodes arranged such that the electrodes surround the input device.

3. The system according to claim 2, wherein the electrode arrangement is configured to detect a gesture performed in a 3D space above the electrode arrangement, wherein the electrode arrangement comprises a transmission electrode for generating a quasi-static electric field and a plurality of reception electrodes arranged around said input device.

4. The system according to claim 3, wherein the reception electrodes around said input device can be configured to operate as non-touching gesture detection sensors in a first operating mode and as touch sensors in a second operating mode.

5. The system according to claim 4, wherein the operating modes are time-multiplexed.

6. The system according to claim 2, wherein the electrode arrangement comprises a plurality of electrode sensors around said input device that can be configured to operate as touch sensors arranged.

7. The system according to claim 2, wherein a touch detection on one of said electrodes combined with an input on said input device performs a predefined function of the processing system.

8. The system according to claim 2, wherein the input device is a touchpad and the input action is a touch detection on an electrode of said electrode arrangement and the input from said input device is a touch movement performed on said touch pad.

9. The system according to claim 8, wherein the electrode arrangement comprises a plurality of electrodes and a touched electrode defines the predefined function which is selected from the group consisting of horizontal scrolling, vertical scrolling, and zooming.

10. The system according to claim 1, wherein the sensor arrangement comprises infra-red sensors.

11. The system according to claim 1, wherein the sensor arrangement comprises ultrasound sensors.

12. The system according to claim 1, wherein the input device is a touch sensor comprising a matrix of capacitive sensor elements, wherein in one operating mode the matrix of capacitive sensor elements operate as a touch sensor and wherein in a second operating mode predefined sets of sensor elements can be combined to form individual elongated sensor elements, wherein in the second operating mode, the individual elongated sensor elements of the input device form the sensor arrangement to monitor the area above the input device.

13. The system according to claim 1, wherein the predefined non-touching input actions are used to block or unblock said input device based on a detection of predefined non-touching adjacent to said input device.

14. The system according to claim 1, wherein the predefined non-touching are used to perform predefined functions of the processing system.

15. The system according to claim 1, wherein the identical predefined non-touching gestures are moving a hand vertically across the input device twice.

16. The system according to claim 1, wherein a first predefined function is a copy function and a second predefined function is a paste function.

17. The system according to claim 1, wherein:
the sensor arrangement is an electrode arrangement comprising a plurality of electrodes arranged such that the electrodes surround the input device;
the electrode arrangement is configured to detect a gesture performed in a 3D space above the electrode arrangement; and
the electrode arrangement comprises a transmission electrode formed on a first side of a substrate of the sensor arrangement and a reception electrode formed on an opposite, second side of the substrate of the sensor arrangement.

18. The system according to claim 1, wherein the sensor arrangement is configured to detect a proximity of a hand of a user on an outside of the input device and, based upon the detection, the controller is configured to block input to the input device.

19. The system according to claim 1, wherein the sensor arrangement is configured to detect a proximity of a hand of a user on an outside of the input device and, based upon the detection, the controller is configured to block input to another input device.

20. The system according to claim 1, wherein the sensor arrangement is configured to detect a proximity of a hand of a user while the system is in a standby mode and, based upon the detection, the controller is configured to activate a backlight of a keyboard.

21. The system according to claim 1, wherein:
the sensor arrangement includes an electrode arrangement comprising a plurality of electrodes arranged such that the electrodes surround the input device;
the sensor arrangement includes is configured to detect a simultaneous touch of the input device and proximity to portions of the electrodes surrounding the input device; and
the controller is configured to, based upon the detection of a simultaneous touch of the input device and proximity to portions of the electrodes surrounding the input device, identify a gesture for scrolling.

22. The system according to claim 1, wherein:
the sensor arrangement is configured to detect two consecutive movements towards the input device and to detect two consecutive movements away from the input device; and
the controller is configured to, based upon detection of the two consecutive movements away the input device, identify a gesture to copy data from an application executing on the system; and
the controller is further configured to, based upon detection of the two consecutive movements towards the input device, identify a gesture to paste the data copied from the application executing on the system.

23. The system according to claim 1, wherein the sequence of multiple, identical non-touching gestures must be performed within a predetermined time period for detection.

24. A system comprising:
a processing system;
an input device integrated within the processing system and coupled with the processing system; and
a sensor arrangement integrated with the processing system and configured to monitor an area around said input device, and a controller coupled with the sensor arrangement to detect predefined non-touching input actions, wherein the controller is coupled with the processing system, wherein the controller is configured only upon detection of a predefined non-touching input action to forward an associated command to the processing system, wherein a predefined non-touching input action comprises a predefined sequence of at least two non-touching gestures thereby discarding unintentional movements in the area around said input device, wherein the sensor arrangement is configured to detect a double movement of a hand from a keyboard towards the input device and, based upon the detection, the controller is configured to identify the movement as a gesture to close an application.

25. The system according to claim 24, wherein the sensor arrangement is an electrode arrangement comprising a plurality of electrodes arranged such that the electrodes surround the input device, and wherein the electrode arrangement is configured to detect a gesture performed in a 3D space above the electrode arrangement, wherein the electrode arrangement comprises a transmission electrode for generating a quasi-static electric field and a plurality of reception electrodes arranged around said input device.

26. The system according to claim 24, wherein the sensor arrangement comprises infra-red sensors or ultrasound sensors.

27. The system according to claim 24, wherein the non-touching input actions are detected by the controller and said command is forwarded to the processing system to perform predefined functions of the processing system.

28. The system according to claim 24, wherein the sequence of at least two non-touching gestures comprises multiple identical non-touching gestures.

29. The system according to claim 28, wherein the identical non-touching gestures are moving a hand vertically across the input device twice.

30. The system according to claim 24, wherein the input device is a touch sensor comprising a matrix of capacitive sensor elements, wherein in one operating mode the matrix of capacitive sensor elements operate as a touch sensor and wherein in a second operating mode predefined sets of sensor elements can be combined to form individual elongated sensor elements, wherein in the second operating mode, the input device forms the sensor arrangement to monitor the area above the input device.

31. The system according to claim 24, wherein the predefined sequence of at least two non-touching gestures must be performed within a predetermined time period for detection.

32. A method for operating a data processing device, wherein the data processing device comprises an input device integrated within the processing system; the method comprising the steps of:
integrating a sensor arrangement within the data processing device such that an area surrounding said input device is monitored by the sensor arrangement,
detecting predefined non-touching gestures by a controller coupled with the sensor arrangement, wherein the non-touching gestures include a sequence of multiple, identical non-touching gestures performed in succession,
detecting the sequence of multiple, identical non-touching gestures performed in succession, including detecting a double movement of a hand from a keyboard towards the input device, and
forwarding an associated command to the processing system.

33. The method according to claim 32, wherein the sensor arrangement is an electrode arrangement comprising a plurality of electrodes arranged such that the electrodes surround the input device.

34. The method according to claim 33, wherein the electrode arrangement is configured to detect a non-touching gesture performed in a 3D space above the electrode arrangement, wherein the electrode arrangement comprises a transmission electrode for generating a quasi-static electric field and a plurality of reception electrodes arranged around said input device.

35. The method according to claim 34, further comprising configuring the reception electrodes around said input device to operate as non-touching gesture detection sensors in a first operating mode and as touch sensors in a second operating mode.

36. The method according to claim 35, wherein the operating modes are time-multiplexed.

37. The method according to claim 33, wherein the electrode arrangement comprises a plurality of electrode sensors around said input device, and the method comprises configuring the electrode sensors to operate as touch sensors.

38. The method according to claim 33, further comprising:
detecting a touch on one of the electrodes and combining the touch detection with an input on said input device to generate an associated command;
forwarding the associated command to the processing system; and
in response, performing a predefined function by the processing system.

39. The method according to claim 38, wherein the input device is a touchpad and wherein the input from said input device is a touch movement performed on said touch pad.

40. The method according to claim 39, wherein the electrode arrangement comprises a plurality of electrodes and the touched electrode defines the predefined function which is selected from the group consisting of horizontal scrolling, vertical scrolling, and zooming.

41. The method according to claim 32, wherein the sensor arrangement comprises infra-red sensors.

42. The method according to claim 32, wherein the sensor arrangement comprises ultrasound sensors.

43. The method according to claim 32, wherein the input actions are used to block or unblock said input device based on a detection of input actions adjacent to said input device.

44. The method according to claim 32, wherein the input actions are used to perform predefined functions of the processing system.

45. The method according to claim 32, wherein the identical non-touching gestures are moving a hand vertically across the input device twice and wherein the identical non-touching gestures must be performed within a predetermined time period for detection.

46. The method according to claim 32, wherein a first predefined function is a copy function and a second predefined function is a paste function.

* * * * *